US012575984B2

(12) United States Patent
Nagasawa et al.

(10) Patent No.: US 12,575,984 B2
(45) Date of Patent: Mar. 17, 2026

(54) VEHICLE

(71) Applicant: YAMAHA HATSUDOKI KABUSHIKI KAISHA, Iwata (JP)

(72) Inventors: Kenta Nagasawa, Shizuoka (JP); Masayuki Kawamura, Shizuoka (JP); Masanori Yoshihara, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 306 days.

(21) Appl. No.: 18/374,701

(22) Filed: Sep. 29, 2023

(65) Prior Publication Data

US 2024/0024176 A1 Jan. 25, 2024

Related U.S. Application Data

(63) Continuation of application No. PCT/JP2021/014361, filed on Apr. 2, 2021.

(51) Int. Cl.
*B62K 5/08* (2006.01)
*A61G 5/10* (2006.01)

(52) U.S. Cl.
CPC .......... *A61G 5/1078* (2016.11); *A61G 5/1051* (2016.11); *A61G 5/1097* (2016.11)

(58) Field of Classification Search
CPC .......... B62K 25/08; B62K 5/007; B62K 5/08; B62D 25/186; B62D 35/00; B62D 37/02; B62D 25/18; A61G 5/1078; A61G 5/1051; A61G 5/1097
USPC .......................................................... 280/160
See application file for complete search history.

(56) References Cited

FOREIGN PATENT DOCUMENTS

| | | | | |
|---|---|---|---|---|
| JP | 05229325 | A | * | 9/1993 |
| JP | 2000-247155 | A | | 9/2000 |
| JP | 2003-261039 | A | | 9/2003 |
| JP | 2006-312393 | A | | 11/2006 |
| JP | 2010-064560 | A | | 3/2010 |
| JP | 2012214097 | A | * | 11/2012 |
| JP | 2016-106869 | A | | 6/2016 |
| JP | 2019-026196 | A | | 2/2019 |
| JP | 2020-051466 | A | | 4/2020 |
| JP | 2020048611 | A | * | 4/2020 |

OTHER PUBLICATIONS

Translation of JP2020048611A accessed at www.espacenet.com on Sep. 27, 2025. (Year: 2018).*
Translation of JP 2012214097A accessed at www.espacenet.com on Sep. 28, 2025. (Year: 2012).*
Translation of JP 05229325 A accessed at www.espacenet.com on Sep. 28, 2025. (Year: 1993).*
Official Communication issued in International Patent Application No. PCT/JP2021/014361, mailed on Jun. 29, 2021.

* cited by examiner

*Primary Examiner* — James A Shriver, II
*Assistant Examiner* — Hilary L Johns
(74) *Attorney, Agent, or Firm* — Keating & Bennett, LLP

(57) ABSTRACT

A vehicle includes at least three wheels including a steered wheel, at least one drive source to drive at least two of the wheels, and a front suspension including an upper arm and a lower arm supporting the steered wheel. In a state where the vehicle is stationary on a level road surface, an anhedral angle of the lower arm is larger than an anhedral angle of the upper arm, and a difference between the anhedral angle of the lower arm and the anhedral angle of the upper arm is 5 degrees or more.

22 Claims, 10 Drawing Sheets

VEHICLE

CROSS REFERENCE TO RELATED APPLICATIONS

This application is a Continuation Application of PCT Application No. PCT/JP2021/014361 filed on Apr. 2, 2021. The entire contents of this application are hereby incorporated herein by reference.

BACKGROUND OF THE INVENTION

1. Field of the Invention

The present invention relates to a vehicle.

2. Description of the Related Art

A handle-type electric wheelchair has been known as one of the vehicles that run with a human on board (e.g., Japanese Laid-Open Patent Publication No. 2000-247155). A handle-type electric wheelchair is sometimes referred to as an electric cart.

Generally, handle-type electric wheelchairs are used for traveling on relatively flat paved roads. For example, the user can ride a handle-type electric wheelchair between home and a store to do shopping.

SUMMARY OF THE INVENTION

There is a need to further improve the driving performance of such vehicles.

A vehicle according to a preferred embodiment of the present invention includes at least three wheels including a steered wheel, at least one drive source to drive at least two of the wheels, and a suspension including an upper arm and a lower arm supporting the steered wheel, wherein, in a state where the vehicle is stationary on a level road surface, an anhedral angle of the lower arm is larger than an anhedral angle of the upper arm, and a difference between the anhedral angle of the lower arm and the anhedral angle of the upper arm is 5 degrees or more.

As a result of the anhedral angle of the lower arm being larger than the anhedral angle of the upper arm, with the anhedral angle difference being 5 degrees or more, it is possible to reduce the amount of change in the angle between the longitudinal direction of each of the upper arm and the lower arm and a tire center line when the suspension moves in a stroke. This increases a clearance between the suspension and the steered wheel, and it is possible to both increase the wheel stroke and increase the steering angle of the steered wheel.

In a preferred embodiment, the difference between the anhedral angle of the lower arm and the anhedral angle of the upper arm may be 5 degrees or more and 9 degrees or less.

As a result of the difference between the anhedral angle of the lower arm and the anhedral angle of the upper arm being large, it is possible to reduce the amount of change in the angle between the longitudinal direction of each of the upper arm and the lower arm and the tire center line when the suspension moves in a stroke.

In a preferred embodiment, the amount of change in a camber angle of the steered wheel relative to the wheel stroke of the suspension may be 5 degrees or more.

As a result of the camber angle of the steered wheel being able to significantly change in response to the stroke of the suspension, it is possible to reduce the amount of change in the angle between the longitudinal direction of each of the upper arm and the lower arm and the tire center line.

In a preferred embodiment, the amount of change in the camber angle of the steered wheel relative to the wheel stroke of the suspension may be 5 degrees or more and 10 degrees or less.

As a result of the camber angle of the steered wheel being able to significantly change in response to the stroke of the suspension, it is possible to reduce the amount of change in the angle between the longitudinal direction of each of the upper arm and the lower arm and the tire center line.

In a preferred embodiment, when the suspension moves in a bound stroke, the camber angle of the steered wheel may have a negative camber, and when the suspension moves in a rebound stroke, the camber angle of the steered wheel may have a positive camber.

As a result of the camber angle being able to change between a negative camber and a positive camber in response to the stroke of the suspension, it is possible to reduce the amount of change in the angle between the longitudinal direction of each of the upper arm and the lower arm and the tire center line.

In a preferred embodiment, in a state where the vehicle is stationary on the level road surface, the anhedral angle of the upper arm may be 15 degrees or more, and the anhedral angle of the lower arm may be 20 degrees or more.

As a result of the anhedral angle of the upper arm and the anhedral angle of the lower arm being as large as 15 degrees or more and 20 degrees or more, respectively, it is possible to increase the roll rigidity.

In a preferred embodiment, in a state where the vehicle is stationary on the level road surface, the anhedral angle of the upper arm may be 15 degrees or more and 20 degrees or less, and the anhedral angle of the lower arm may be 20 degrees or more and 25 degrees or less.

As a result of the anhedral angle of the upper arm and the anhedral angle of the lower arm being large, it is possible to increase the roll rigidity.

In a preferred embodiment, a swing angle of each of the upper arm and the lower arm may be 30 degrees or more.

As a result of the swing angle of the upper arm and the swing angle of the lower arm being as large as 30 degrees or more, it is possible to improve the driving performance on unpaved roads and bumps.

In a preferred embodiment, the swing angle of each of the upper arm and the lower arm may be 30 degrees or more and 60 degrees or less.

As a result of the swing angle of the upper arm and the swing angle of the lower arm being large, it is possible to improve the driving performance on unpaved roads and bumps.

In a preferred embodiment, the wheel stroke of the suspension may be 60 mm or more.

As a result of the wheel stroke being as large as 60 mm or more, it is possible to improve the driving performance on unpaved roads and bumps.

In a preferred embodiment, the wheel stroke of the suspension may be 60 mm or more and 150 mm or less.

As a result of the wheel stroke being large, it is possible to improve the driving performance on unpaved roads and bumps.

In a preferred embodiment, the wheel stroke of the suspension may be 0.5 times or more of the length in the longitudinal direction of each of the upper arm and the lower arm.

As a result of the wheel stroke being as large as 0.5 times or more of the length in the longitudinal direction of each of the upper arm and the lower arm, it is possible to improve the driving performance on unpaved roads and bumps.

In a preferred embodiment, the wheel stroke of the suspension may be 0.5 times or more and 0.80 times or less of the length in the longitudinal direction of each of the upper arm and the lower arm.

As a result of the wheel stroke being large, it is possible to improve the driving performance on unpaved roads and bumps.

In a preferred embodiment, the steered wheel may include an inner wheel and an outer wheel, a maximum value of a steering angle of the inner wheel may be 50 degrees or more, and a maximum value of a steering angle of the outer wheel may be 35 degrees or more.

As a result of the steering angle of the steered wheel being large, it is possible to reduce the minimum turning radius of the vehicle, and it is possible to turn in a small radius.

In a preferred embodiment, the maximum value of the steering angle of the inner wheel may be 50 degrees or more and 80 degrees or less, and the maximum value of the steering angle of the outer wheel may be 35 degrees or more and 80 degrees or less.

As a result of the steering angle of the steered wheel being large, it is possible to reduce the minimum turning radius of the vehicle, and it is possible to turn in a small radius.

In a preferred embodiment, the minimum turning radius of the vehicle may be 2.5 times or less of the tread width of the steered wheels.

As a result of the minimum turning radius for the tread width being small, it is possible to turn in a small radius.

In a preferred embodiment, the minimum turning radius of the vehicle may be 1400 mm or less.

As a result of the minimum turning radius of the vehicle being small, it is possible to turn in a small radius.

In a preferred embodiment, an outer diameter of the steered wheel may be 0.26 times or more of the overall length of the vehicle.

As a result of the outer diameter of the steered wheel being as large as 0.26 times or more of the overall length of the vehicle, it is possible to improve the driving performance on unpaved roads and bumps and to improve the ride comfort.

In a preferred embodiment, the outer diameter of the steered wheel may be 0.26 times or more and 0.4 times or less of the overall length of the vehicle.

As a result of the outer diameter of the steered wheel being large relative to the overall length of the vehicle, it is possible to improve the driving performance on unpaved roads and bumps and to improve the ride comfort.

In a preferred embodiment, the outer diameter of the steered wheel may be 0.43 times or more of a wheelbase of the vehicle.

As a result of the outer diameter of the steered wheel being as large as 0.43 times or more of the wheelbase of the vehicle, it is possible to improve the driving performance on unpaved roads and bumps and to improve the ride comfort.

In a preferred embodiment, the outer diameter of the steered wheel may be 0.43 times or more and 0.67 times or less of a wheelbase of the vehicle.

As a result of the outer diameter of the steered wheel being large relative to the wheelbase of the vehicle, it is possible to improve the driving performance on unpaved roads and bumps and to improve the ride comfort.

In a preferred embodiment, the vehicle may be an electric wheelchair, and may further include a handle that is steered by a passenger, and a seat on which the passenger is seated.

It is possible to realize an electric wheelchair, wherein the wheel stroke is large and the steering angle of the steered wheel is large.

As a result of the anhedral angle of the lower arm being larger than the anhedral angle of the upper arm, with the anhedral angle difference being 5 degrees or more, it is possible to reduce the amount of change in the angle between the longitudinal direction of each of the upper arm and the lower arm and the tire center line when the suspension moves in a stroke. This increases the clearance between the suspension and the steered wheel, and it is possible to both increase the wheel stroke and increase the steering angle of the steered wheel.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will now be described with reference to the drawings. Like elements are denoted by like reference signs, and will not be described redundantly. The terms front, rear, up, down, left and right, as used in the description below, refer to these directions as seen from a passenger seated in the seat of the vehicle. The left-right direction of the vehicle may be referred to as the vehicle width direction. Note that the following preferred embodiments are illustrative, and the present invention is not limited to the following preferred embodiments.

Figure 1:
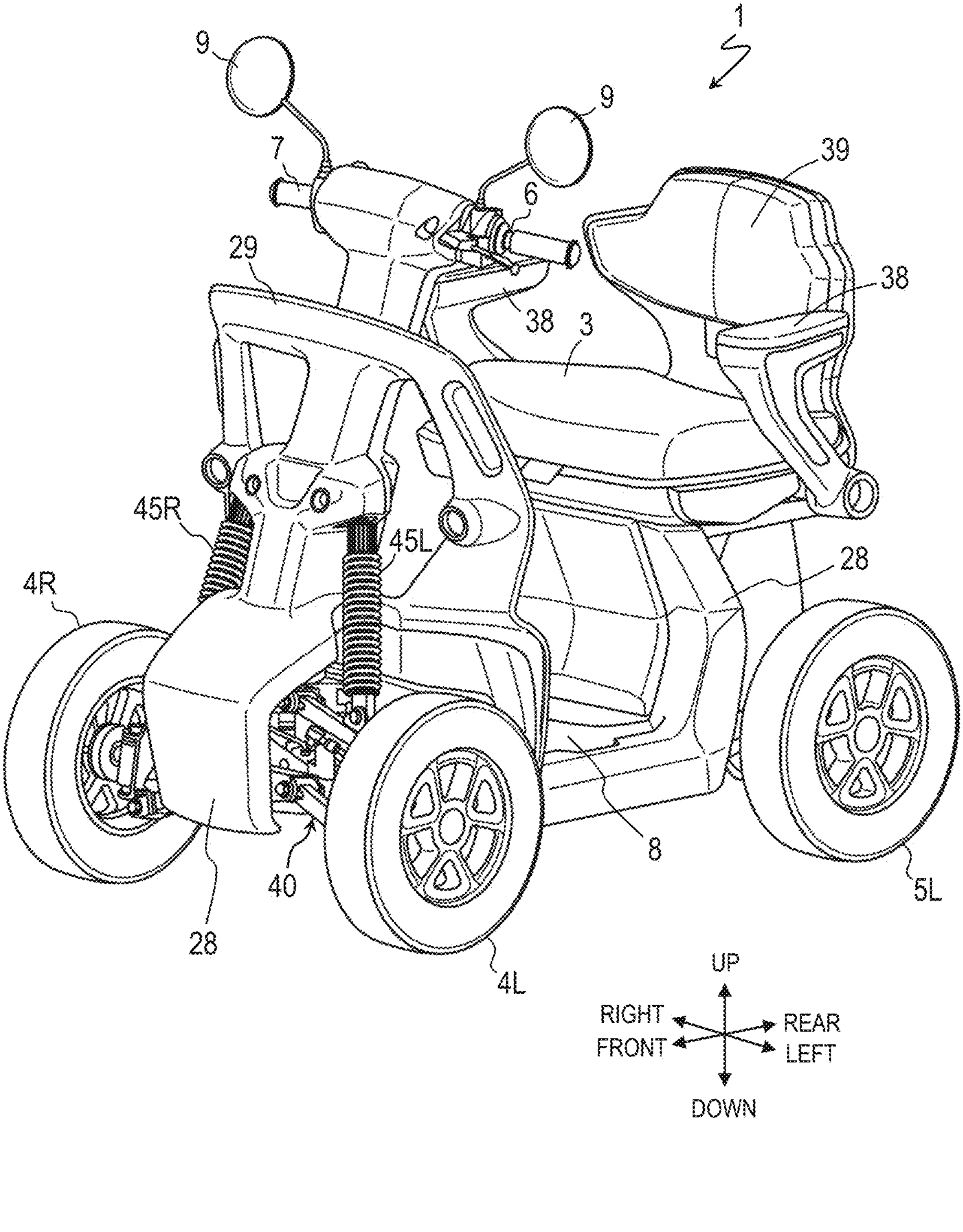
FIG. 1 is a perspective view showing a vehicle 1 according to a preferred embodiment of the present invention.
Figure 2:
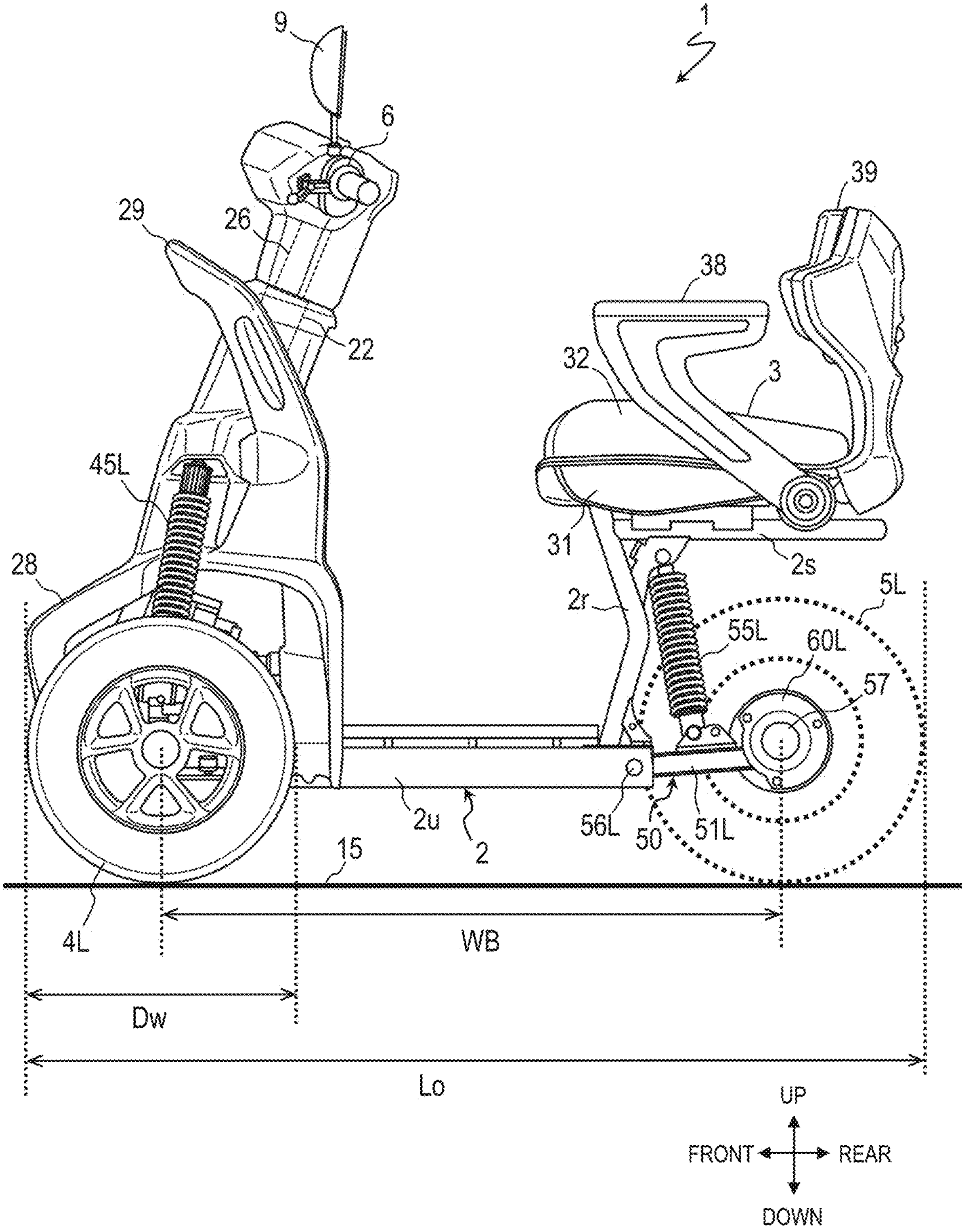
FIG. 2 is a left side view showing the vehicle 1 according to a preferred embodiment of the present invention.
Figure 3:
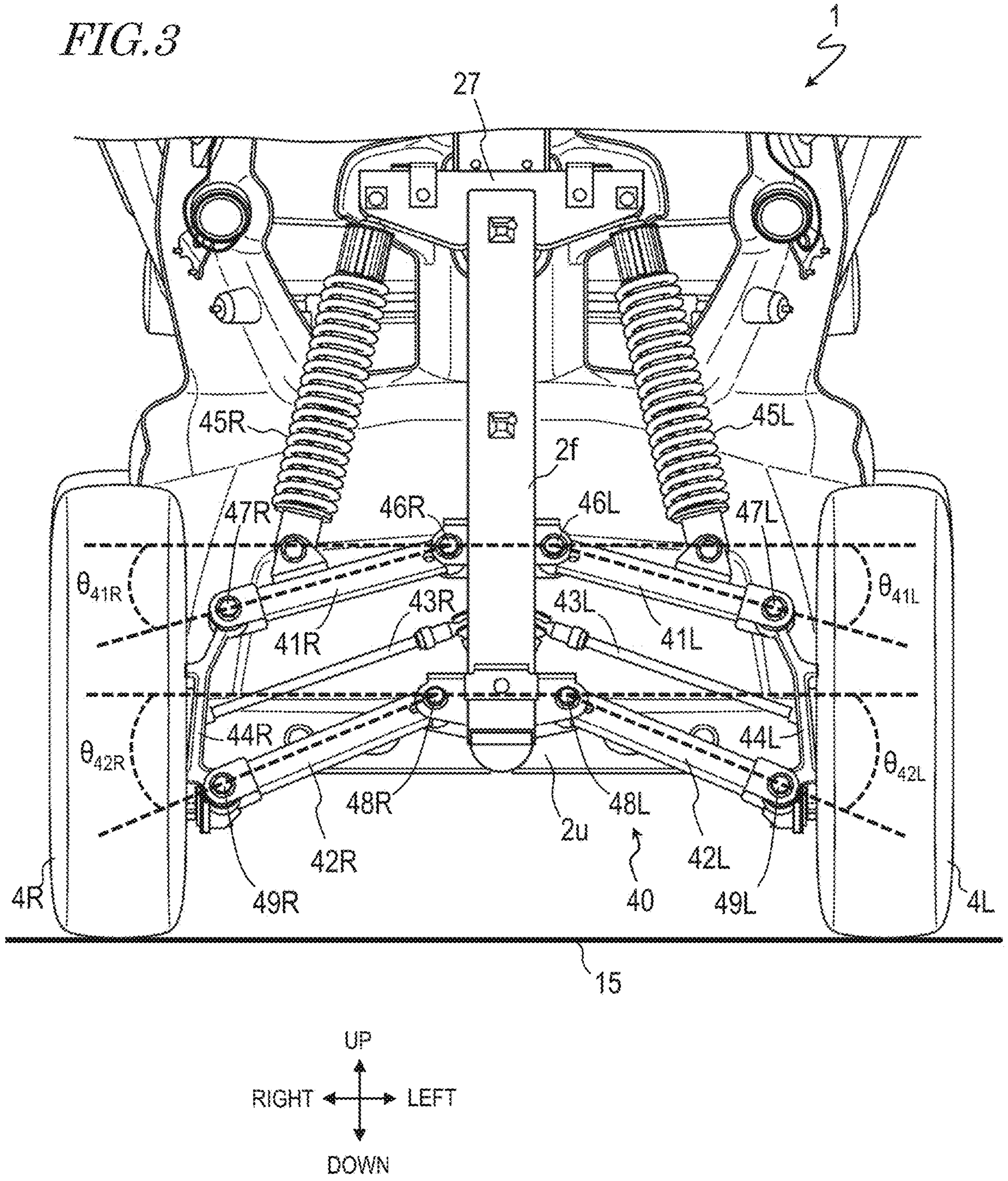
FIG. 3 is a front view showing the vehicle 1 according to a preferred embodiment of the present invention.

FIG. 1 is a perspective view showing a vehicle 1 according to a preferred embodiment. FIG. 2 is a left side view showing the vehicle 1. FIG. 3 is a front view showing the vehicle 1. In order to clearly illustrate the structure of the vehicle 1, a portion of the body cover is omitted in the figures. The vehicle 1 is, for example, a handle-type electric wheelchair, but the present invention is not limited thereto. An example in which the vehicle 1 is a handle-type electric wheelchair will be described below.

The vehicle 1 includes a vehicle body frame 2 (FIG. 2). The vehicle body frame 2 includes an under frame 2*u*, a rear frame 2*r*, a seat frame 2*s* and a front frame 2*f* (FIG. 3). The under frame 2*u* extends in the front-rear direction of the vehicle 1. The rear frame 2*r* extends upward from a rear portion of the under frame 2*u*, and the seat frame 2*s* extends rearward from an upper portion of the rear frame 2*r*. The front frame 2*f* extends upward from a front portion of the under frame 2*u*.

A head tube 22 (FIG. 2) is provided on an upper portion of the front frame 2*f* (FIG. 3). The head tube 22 rotatably supports a steering column 26 passing through the inside thereof. A handle 6 that is steered by the passenger is provided on an upper end portion of the steering column 26. An accelerator operator 7 (FIG. 1) and a pair of left and right rearview mirrors 9 are provided on the handle 6.

A body cover 28 is provided so as to cover a portion of the vehicle body frame 2. A front guard 29 is provided on the body cover 28. With the front guard 29 arranged forward of the passenger, it is possible to provide the passenger with a sense of security when driving.

An independent front suspension 40 is provided on the front frame 2*f* (FIG. 3). The front suspension 40 includes an upper arm 41L, a lower arm 42L and a shock absorber 45L. One end of the upper arm 41L is rotatably supported by the front frame 2*f* via a pivot 46L. The other end of the upper arm 41L rotatably supports a knuckle arm 44L via a pivot 47L. One end of the lower arm 42L is rotatably supported by the front frame 2*f* via a pivot 48L. The other end of the lower arm 42L rotatably supports the knuckle arm 44L via a pivot 49L. The knuckle arm 44L rotatably supports the front wheel 4L.

The front suspension 40 includes an upper arm 41R, a lower arm 42R and a shock absorber 45R. One end of the upper arm 41R is rotatably supported by the front frame 2*f* via a pivot 46R. The other end of the upper arm 41R rotatably supports a knuckle arm 44R via a pivot 47R. One end of the lower arm 42R is rotatably supported by the front frame 2*f* via a pivot 48R. The other end of the lower arm 42R rotatably supports the knuckle arm 44R via a pivot 49R. The knuckle arm 44R rotatably supports the front wheel 4R. The front suspension 40 rotatably supports the front wheels 4L and 4R via the knuckle arms 44L and 44R. The front wheels 4L and 4R are steered wheels.

The front suspension 40 may be referred to as a double wishbone-type suspension. In the present specification, the arm shape of the double wishbone-type suspension is not limited to the A-letter shape (V-letter shape). In the present specification, "double wishbone-type" is a generic term for a suspension system in which the wheels are supported by a pair of upper and lower arms.

The front frame 2F is provided with a suspension tower 27. The upper portions of the shock absorbers 45L and 45R are rotatably supported by the suspension tower 27. The lower portion of the shock absorber 45L rotatably supports the upper arm 41L. The lower portion of the shock absorber 45R rotatably supports the upper arm 41R.

The front frame 2*f* extends in the up-down direction at a position in the vicinity of the center in the vehicle width direction. The frame portion to which the suspension is attached is required to have high strength because the impact received by the suspension from the road surface is transmitted thereto. Where the suspension tower 27 is provided in the vicinity of the left and right end portions of the vehicle body, high strength needs to be provided in the frame portion extending in the left-right direction from the central portion in the vehicle width direction, thus resulting in a large vehicle body weight. By providing the suspension tower 27 on the front frame 2*f* located in the vicinity of the center in the vehicle width direction, there is no longer a need for such a frame portion having high strength and extending in the left-right direction, thus realizing a reduced vehicle body weight.

The shock absorbers 45L and 45R are attached to the upper arms 41L and 41R.

Figure 4A:
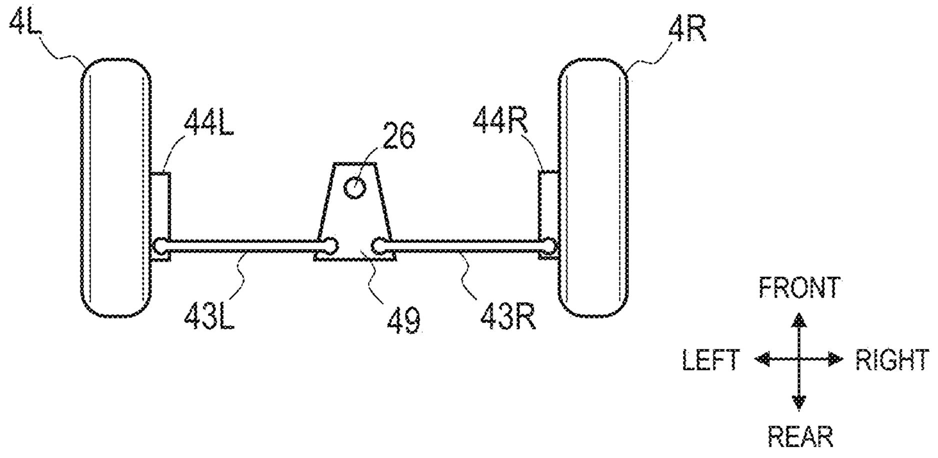
FIG. 4A is a plan view showing an overview of a steering mechanism included in the vehicle 1 according to a preferred embodiment of the present invention.
Figure 4B:
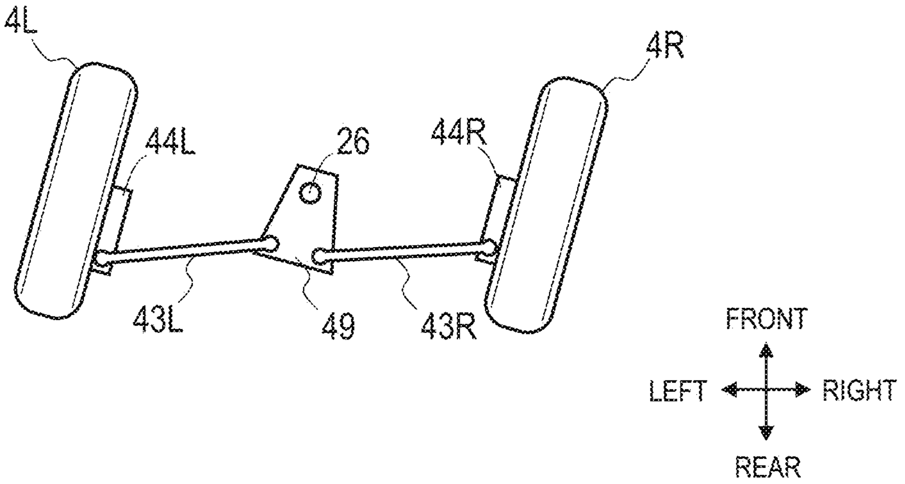
FIG. 4B is a plan view showing an overview of the steering mechanism of the vehicle 1 according to a preferred embodiment of the present invention.

FIGS. 4A and 4B are plan views showing an overview of the steering mechanism of the vehicle 1. A pitman arm 49 is attached to the lower end portion of the steering column 26. One end of a tie rod 43L and one end of a tie rod 43R are each rotatably connected to the pitman arm 49. The other end of the tie rod 43L is rotatably connected to the knuckle arm 44L. The other end of the tie rod 43R is rotatably connected to the knuckle arm 44R.

FIG. 4A shows the steering mechanism when traveling straight. When traveling through a curve, the passenger turns the handle 6 (FIG. 1). Referring to FIG. 4B, the steering force generated by the passenger turning the handle 6 is transmitted to the pitman arm 49 via the steering column 26. The pitman arm 49 rotates around the steering column 26 and the steering force is transmitted to the front wheels 4L and 4R via the tie rods 43L and 43R and the knuckle arms 44L and 44R. The transmitted steering force changes the steering angle of the front wheels 4L and 4R allowing the vehicle 1 to travel while turning left or right.

Referring to FIG. 1 and FIG. 2, a seat 3, on which the passenger is seated, is provided on the seat frame 2*s*. The seat 3 includes a seat base 31 provided on the seat frame 2*s* and a cushion 32 provided on the seat base 31.

The seat base 31 is also called a plate member or a bottom plate. The seat base 31 forms the bottom portion of the seat 3 and serves to provide the strength of the seat 3 as a whole. Therefore, the sheet base 31 is formed from a relatively rigid material. The material of the sheet base 31 can be, for example, but not limited to, a metal material or a synthetic resin material such as polypropylene.

The cushion 32 is overlaid on the surface of the seat base 31. The cushion 32 can be formed from a material that retains appropriate elasticity over time to maintain good ride comfort. For example, but not limited to, polyurethane foam (urethane foam) can be used as the material for the cushion 32.

On both sides of the seat 3, armrests 38 are provided on which the passenger places his/her arms. The armrests 38 also serve as side guards. At the rear portion of the seat 3, a backrest 39 is provided on which the passenger leans.

The under frame 2*u* is provided with a footboard 8 (FIG. 1) on which the passenger places his/her feet. The footboard 8 has a non-slip finish. The upper surface of the footboard 8 has a generally flat shape so that the passenger can easily get in and out of the vehicle.

Figure 5:
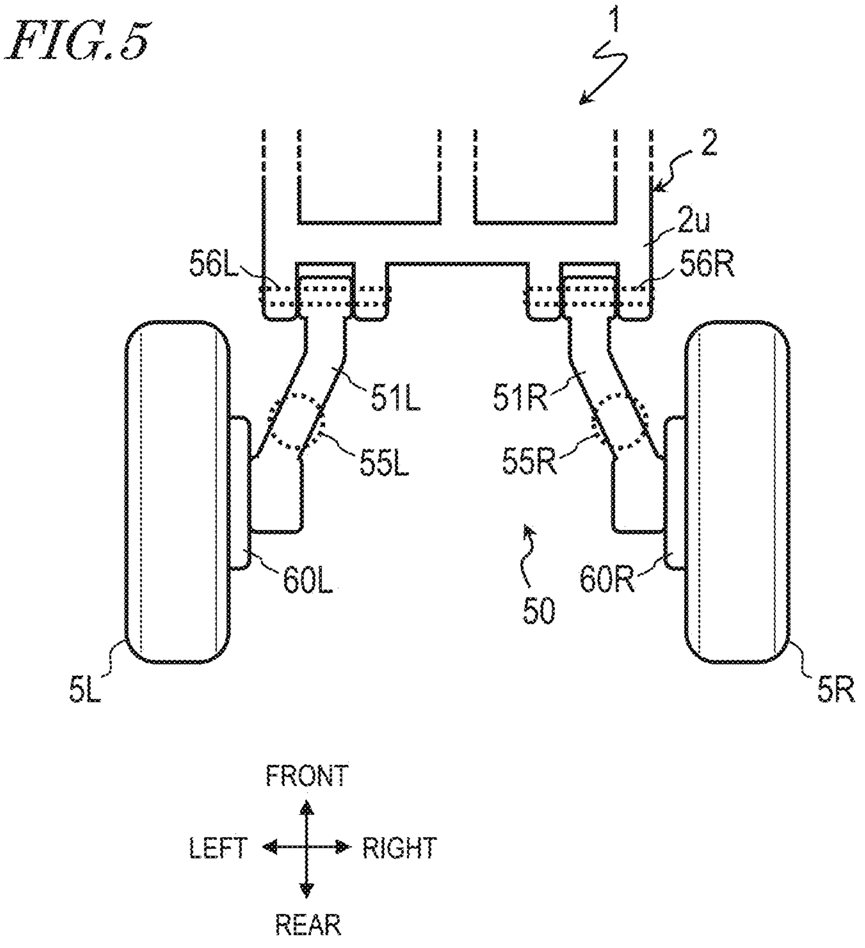
FIG. 5 is a front view showing a rear suspension 50 according to a preferred embodiment of the present invention.

An independent rear suspension 50 (FIG. 2) is provided at the rear portion of the under frame 2*u*. FIG. 5 is a front view showing the rear suspension 50. The rear suspension 50 may be referred to as a trailing arm suspension.

The rear suspension 50 includes rear arms 51L and 51R and shock absorbers 55L and 55R. The rear arms 51L and 51R are swing arms. The front portion of the rear arm 51L is rotatably supported on the left rear portion of the under frame 2*u* via a pivot 56L. The front portion of the rear arm 51R is rotatably supported on the right rear portion of the under frame 2*u* via a pivot 56R.

The upper portion of the shock absorber 55L and the upper portion of the shock absorber 55R are each rotatably supported by the rear frame 2*r* (FIG. 2). The lower portion of the shock absorber 55L rotatably supports the rear arm 51L. The lower portion of the shock absorber 55R rotatably supports the rear arm 51R.

An electric motor 60L is provided at the rear portion of the rear arm 51L. The electric motor 60L is an in-wheel motor, and the rear wheel 5L is provided on the electric motor 60L. The rear suspension 50 rotatably supports the rear wheel 5L via the electric motor 60L. The electric motor 60R is provided at the rear portion of the rear arm 51R. The electric motor 60R is an in-wheel motor, and the rear wheel 5R is provided on the electric motor 60R. The rear suspension 50 rotatably supports the rear wheel 5R via the electric motor 60R. The rear wheels 5L and 5R are drive wheels.

The vehicle 1 of the present preferred embodiment employs large-sized wheels 4L, 4R, 5L and 5R. The outer diameters of the front wheels and the rear wheels are, for example, but not limited to, 14 inches or more. By employing larger-sized front wheels and rear wheels, it is possible to improve the driving performance on unpaved roads and bumps.

In the present preferred embodiment, two electric motors 60L and 60R are used to drive the rear wheels 5L and 5R independently of each other. By controlling the rotation of the left wheels and that of the right wheels independently, it is possible to enhance the stability of the behavior of the vehicle 1 when turning. With vehicles that have differential gears, when one drive wheel idles, it is difficult for the driving force to be transmitted to the other drive wheel. In the present preferred embodiment, even if one of the rear wheels 5L and 5R idles, the other can provide grip so as to continue driving stably.

Note that the electric motors driving the rear wheels 5L and 5R are not limited to in-wheel motors. For example, a single electric motor may transmit driving power to the rear wheels 5L and 5R.

Although a two-wheel drive configuration is illustrated here in which the electric motors 60L and 60R drive the rear wheels 5L and 5R, the vehicle 1 may be four-wheel drive. In that case, in-wheel motors are also provided for each of the front wheels 4L and 4R. Note that the driving force may be transmitted from one electric motor to the front wheels 4L and 4R. The driving force may be transmitted from one electric motor to each of the front wheels 4L and 4R and the rear wheels 5L and 5R.

The vehicle 1 of the present preferred embodiment includes the independent front suspension 40 and the independent rear suspension 50. Two electric motors 60L and 60R are used to drive the rear wheels 5L and 5R independently of each other. Thus, it is possible to improve the ability to follow road surface irregularities and stably transmit driving force to the road surface. It is also possible to improve the turning performance of the vehicle. According to the present preferred embodiment, it is possible to improve the vehicle's driving performance on unpaved roads and bumps.

Note that the rear suspension 50 is not limited to an independent suspension, but may be an axle suspension.

The present preferred embodiment employs in-wheel motors as the electric motor. This eliminates the need to provide space for arranging the electric motor and the power transmission mechanism in the body portion of the vehicle, thus saving space. Since a drive shaft extending in the left-right direction of the vehicle 1 is not required, the rear suspension 50 is not restricted by the drive shaft. In the rear suspension 50, the rear arms 51L and 51R extend in the front-rear direction and the pivots 56L and 56R are located forward relative to a rotation shaft 57 of the rear wheel 5L and 5R. With such a configuration, it is possible to increase the wheel stroke of the rear suspension 50.

The wheel stroke of the rear suspension 50 is, for example, but not limited to, 60 mm or more. As the wheel stroke is as large as 60 mm or more, it is possible to improve the driving performance on unpaved roads and bumps. The upper limit of the wheel stroke of the rear suspension 50 may vary depending on the size of the vehicle 1, and is for example, but not limited to, 150 mm.

Since the drive shaft is not needed and the rear arms 52L and 51R are not located near the central portion of the rear of the vehicle, it is possible to provide space near the central portion of the rear of the vehicle. The space near the central portion of the rear of the vehicle makes it difficult for the main body portion of the vehicle to come into contact with the ground even when a large difference in position in the up-down direction occurs between the left and right rear wheels 5L and 5R in response to the operation of the independent rear suspension 50. Note that if the drive power is transmitted to the rear wheels 5L and 5R from a single electric motor instead of using in-wheel motors, the vehicle 1 may include a drive shaft.

Figure 6:
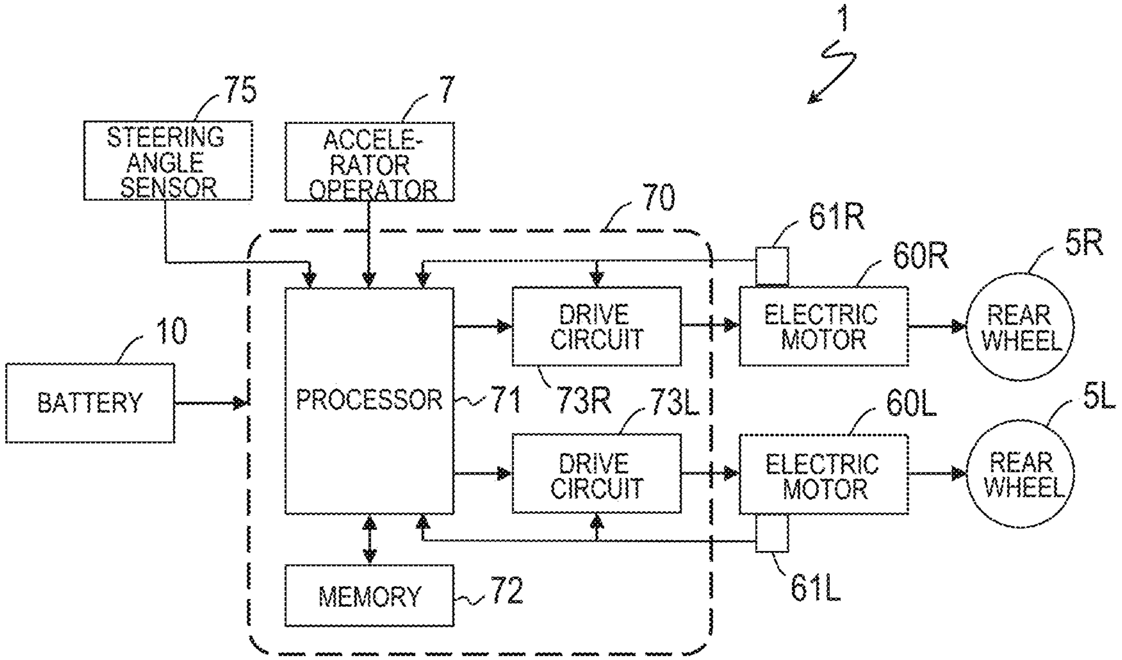
FIG. 6 is a block diagram showing the electrical configuration of the vehicle 1 according to a preferred embodiment of the present invention.

Next, the control of the electric motors 60L and 60R will be described. FIG. 6 is a block diagram showing the electrical configuration of the vehicle 1. The vehicle 1 includes a control device 70. The control device 70 controls the operation of the vehicle 1. The control device 70 includes, for example, a Motor Control Unit (MCU). Typically, the control device 70 includes a semiconductor integrated circuit, such as a microcontroller, a signal processor, etc., capable of performing digital signal processing.

The control device 70 includes a processor 71, a memory 72 and drive circuits 73L and 73R. The processor 71 controls the operation of the electric motors 60L and 60R and the operation of the various parts of the vehicle 1. The memory 72 stores a computer program that defines procedures for controlling the operation of the electric motors 60L and 60R and the various parts of the vehicle 1. The processor 71 reads the computer program from the memory 72 and performs various controls. The control device 70 is supplied with electric power from the battery 10. The control device 70 and the battery 10 can be installed at any position of the vehicle 1, for example, but not limited to, downward of the seat 3. The battery 10 can be provided so as to be removable from the vehicle 1. For example, the battery 10 may be attached/removed to/from the rear of the seat 3. By arranging the battery 10 at an end portion of the vehicle around the seat 3, the passenger can easily attach/remove the battery 10.

The accelerator operator 7 outputs to the processor 71 a signal in accordance with the amount by which the accelerator is operated by the passenger. The steering angle sensor 75 is provided on the head tube 22 or the steering column 26, for example, and outputs a signal to the processor 71 in accordance with the angle of rotation of the steering column 26.

The electric motor 60L is provided with a rotation sensor 61L. The rotation sensor 61L detects the rotation angle of the electric motor 60L and outputs a signal in accordance with the rotation angle to the processor 71 and the drive circuit 73L. The processor 71 and the drive circuit 73L calculate the rotation speed of the electric motor 60L from the output signal of the rotation sensor 61L.

The electric motor 60R is provided with a rotation sensor 61R. The rotation sensor 61R detects the rotation angle of the electric motor 60R and outputs a signal in accordance with the rotation angle to the processor 71 and the drive circuit 73R. The processor 71 and the drive circuit 73R calculate the rotation speed of the electric motor 60R from the output signal of the rotation sensor 61R. The sizes of the rear wheels 5L and 5R are stored in the memory 72 in advance, and the driving speed of the vehicle 1 can be calculated from the rotation speed of the electric motors 60L and 60R.

The processor 71 calculates, and transmits to the drive circuits 73L and 73R, a command value for generating an appropriate driving force from the output signal of the accelerator operator 7, the output signal of the steering angle sensor 75, the traveling speed of the vehicle, and information stored in the memory 72, etc. The processor 71 can send different command values to the drive circuits 73L and 73R depending on the driving condition of the vehicle.

The drive circuits 73L and 73R include, for example, inverters. The drive circuit 73L supplies a drive current in accordance with the command value from the processor 71 to the electric motor 60L. The drive circuit 73R supplies the drive current in accordance with the command value from the processor 71 to the electric motor 60L. The electric motors 60L and 60R to which the drive current is supplied rotate, thus causing the rear wheels 5L and 5R to rotate. If the electric motors 60L and 60R include decelerators, the rotation is transmitted to the rear wheels 5L and 5R via those decelerators.

As described above, the vehicle 1 of the present preferred embodiment includes wheels 4L, 4R, 5L and 5R with a larger outer diameter. Thus, it is possible to improve the running performance on unpaved roads and bumps. On the other hand, the overall length (length in the front-rear direction) of the vehicle 1 may be limited. For example, the Japanese Industrial Standards "JIS T 9208:2016" for handle-type electric wheelchairs limits the overall length of the vehicle to 1200 mm or less. Thus, where the overall length of the vehicle 1 is limited, the wheelbase will be shorter if the outer diameter of the wheels is increased.

Referring to FIG. 2, the outer diameters Dw of the wheels 4L, 4R, 5L and 5R of the present preferred embodiment are relatively large, for example, more than 0.26 times the overall length Lo of the vehicle 1. The outer diameter Dw of the wheels is relatively large, for example, more than 0.43 times the wheelbase WB of the vehicle 1. Thus, if the size of the wheel is relatively large, it is difficult to increase the steering angle of the wheel. The upper limit of the outer diameter Dw of the wheel is, for example, but not limited to, 0.4 times the overall length Lo of the vehicle 1. The wheel outer diameter Dw is, for example, but not limited to, at most 0.67 times the wheelbase WB.

When a wheel with a large outer diameter and width is used as a steered wheel, the suspension supporting the steered wheel and the steered wheel are more likely to interfere with each other, making it difficult to increase the steering angle of the steered wheel. However, vehicles such as handle-type electric wheelchairs are required to be able to turn in a small radius, and the steering angle of the steered wheels is required to be large. When wheels with a large outer diameter and width are used, it is easy for the wheels to interfere with the suspension when the wheels stroke in the up-down direction, thus making it difficult to increase the wheel stroke.

The front suspension 40 of the present preferred embodiment, with which it is possible to increase the steering angle and the wheel stroke, will now be described in detail.

Referring to FIG. 3, the angles of the upper arms 41L and 41R and the lower arms 42L and 42R will be described.

FIG. 3 shows the vehicle 1 in a predetermined state, stationary on a level road surface 15 with a weight having a mass of 75 kg on the seat 3 (FIG. 1). The weight is one of the weights specified in the Japanese Industrial Standards "JIS T 9208:2016" for handle-type electric wheelchairs. With such a weight on the seat 3, it is possible to simulate the state where a human rides in the vehicle 1.

As shown in FIG. 3, the upper arm 41L and the lower arm 42L of the front suspension 40 are inclined so that the height gradually decreases from the central portion in the vehicle width direction (the left-right direction) to the left. That is, the upper arm 41L and the lower arm 42L have anhedral angles $\theta_{41L}$ and $\theta_{42L}$. The anhedral angle is the angle between the vehicle width direction and the longitudinal direction of the arm as the front suspension 40 is viewed from front. When the vehicle 1 is stationary on the level road surface 15, the vehicle width direction can be parallel to the horizontal direction. The longitudinal direction of the arm is, for example, the direction extending from the center of the pivot on the front frame 2*f* side toward the center of the pivot on the knuckle arm side. The anhedral angle may be referred to as a negative dihedral angle.

The upper arm 41R and the lower arm 42R of the front suspension 40 are inclined so that the height gradually decreases from the central portion in the vehicle width direction toward the right side. That is, the upper arm 41R and the lower arm 42R have anhedral angles $\theta_{41R}$ and $\theta_{42R}$.

The anhedral angles $\theta_{41L}$ and $\theta_{41R}$ of the upper arms 41L and 41R are 15 degrees or more, for example. The anhedral angles $\theta_{42L}$ and $\theta_{42R}$ of the lower arms 42L and 42R are 20 degrees or more, for example. With the large anhedral angles of the arms, it is possible to increase the roll rigidity of the vehicle 1. The upper limit of the anhedral angles $\theta_{41L}$ and $\theta_{41R}$ of the upper arms 41L and 41R is, for example, but not limited to, 20 degrees. The upper limit of the anhedral angle $\theta_{42L}$ and $\theta_{42R}$ of the lower arms 42L and 42R is, for example, but not limited to, 25 degrees. Needless to say, each arm of the front suspension 40 has an anhedral angle even when the above-mentioned weight is absent on the seat 3 (corresponding to a state where no passenger is on board).

In the present preferred embodiment, the anhedral angle $\theta_{42L}$ of the lower arm 42L is greater than the anhedral angle $\theta_{41L}$ of the upper arm 41L. The difference between the anhedral angle $\theta_{42L}$ of the lower arm 42L and the anhedral angle $\theta_{41L}$ of the upper arm 41L is, for example, 5 degrees or more. The anhedral angle $\theta_{42R}$ of the lower arm 42R is greater than the anhedral angle $\theta_{41R}$ of the upper arm 41R. The difference between the anhedral angle $\theta_{42R}$ of the lower arm 42R and the anhedral angle $\theta_{41R}$ of the upper arm 41R is, for example, 5 degrees or more. By setting the difference between the anhedral angle of the lower arm and the anhedral angle of the upper arm to 5 degrees or more, it is possible to obtain a desired amount of change in the camber angle as will be described below. The upper limit of the difference between the anhedral angle of the lower arm and the anhedral angle of the upper arm is, for example, but not limited to, 9 degrees. For example, the upper limit of the anhedral angle difference may be 8 degrees.

Figure 7:
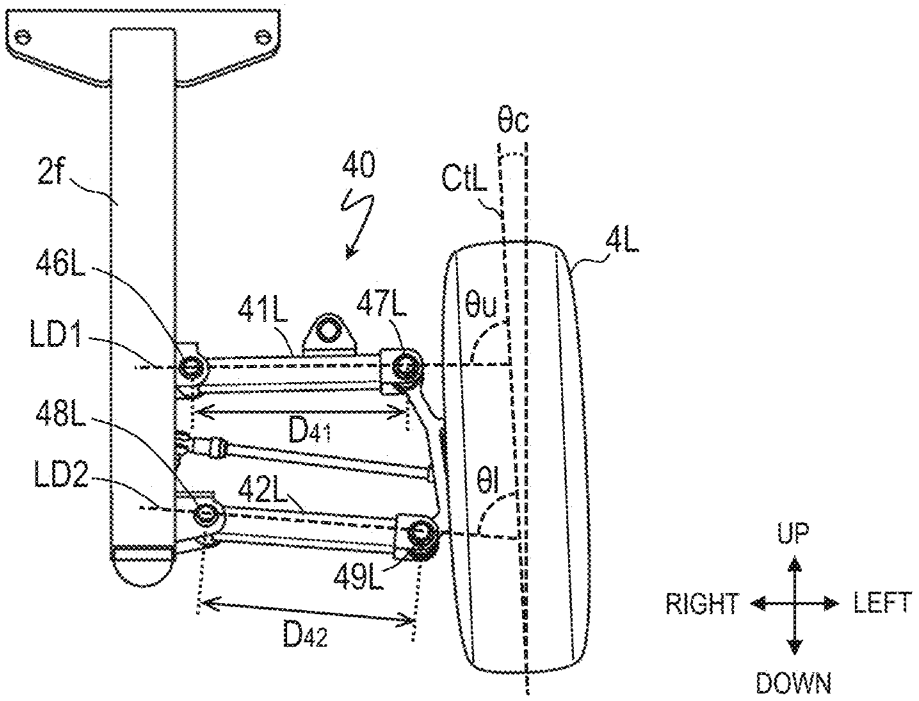
FIG. 7 is a front view showing the front suspension 40 according to a preferred embodiment of the present invention.
Figure 8:
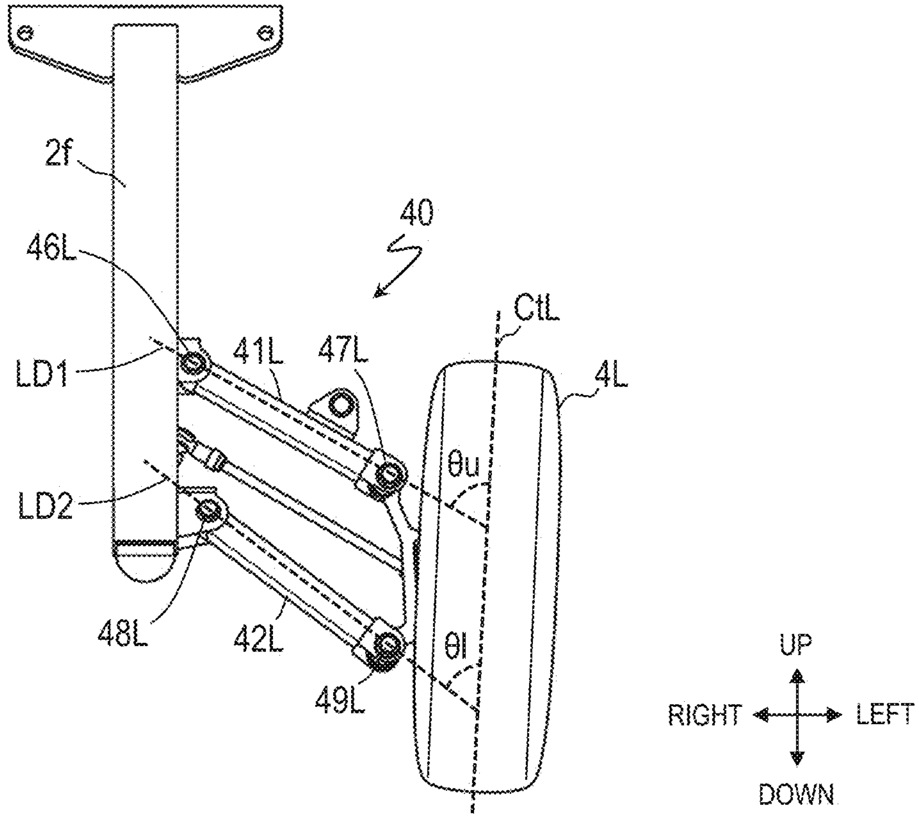
FIG. 8 is a front view showing the front suspension 40 according to a preferred embodiment of the present invention.

FIG. 7 and FIG. 8 are front views showing the front suspension 40. The features of the upper arm 41L, the lower arm 42L, the knuckle arm 44L and the front wheel 4L will now be described primarily, but the features of the upper arm 41R, the lower arm 42R, the knuckle arm 44R and the front wheel 4R are the same. Since the steered wheels in the present preferred embodiment are the front wheels, the front wheels may be referred to as the steered wheels.

FIG. 7 shows the front suspension 40 when the steered wheel 4L moves in the upward direction, i.e., when the front suspension 40 is retracted. FIG. 8 shows the front suspension 40 when the steered wheel 4L moves in the downward direction, i.e., when the front suspension 40 is extended.

The present inventors have discovered that by making the anhedral angle $\theta_{42L}$ of the lower arm 42L (FIG. 3) larger than the anhedral angle $\theta_{41L}$ of the upper arm 41L, it is possible to increase the amount of change in the camber angle θc of the steered wheel 4L when the front suspension 40 strokes. For example, the amount of change in the camber angle θc with respect to the wheel stroke can be set to 5 degrees or more.

As the camber angle θc changes significantly in response to the stroke of the front suspension 40, it is possible to reduce the amount of change in the angle θu between the longitudinal direction LD1 of the upper arm 41L and the tire center line CtL when the front suspension 40 strokes. It is possible to reduce the amount of change in the angle θ1 between the longitudinal direction LD2 of the lower arm 42L and the tire center line CtL when the front suspension 40 strokes.

The amount of change in the angle between the longitudinal direction of the arm and the tire center line means that there is little change in the positional relationship between the arm and the steered wheel. Thus, it is possible to increase the clearance between the front suspension 40 and the steered wheel 4L. As the clearance is large, it is possible to increase the steering angle of the steered wheel 4L and also to increase the wheel stroke.

Figure 9:
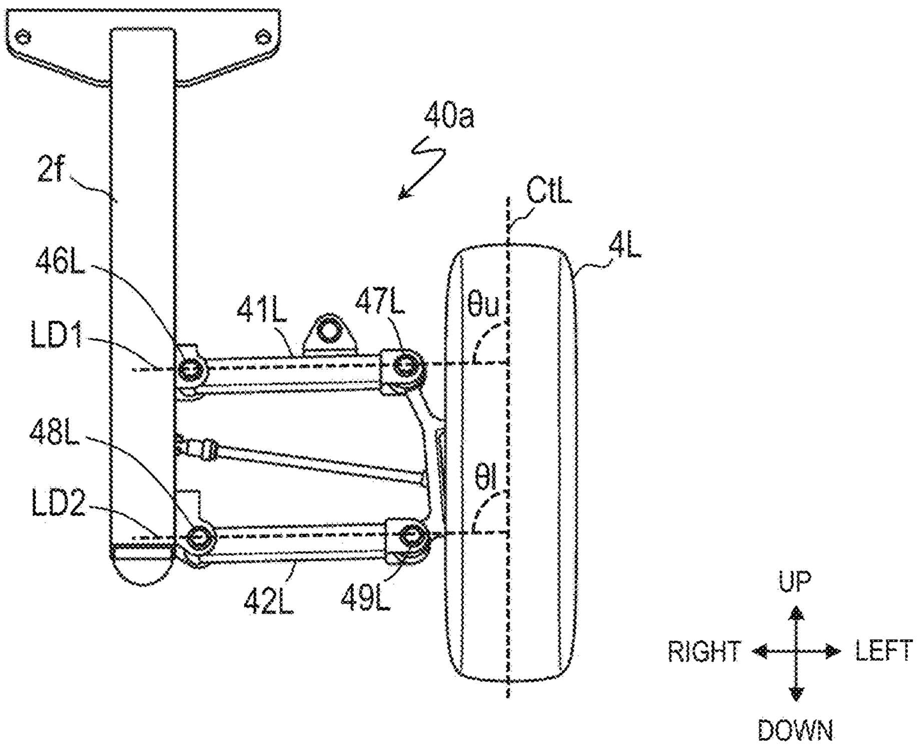
FIG. 9 is a front view showing a front suspension 40*a* of a comparative example.
Figure 10:
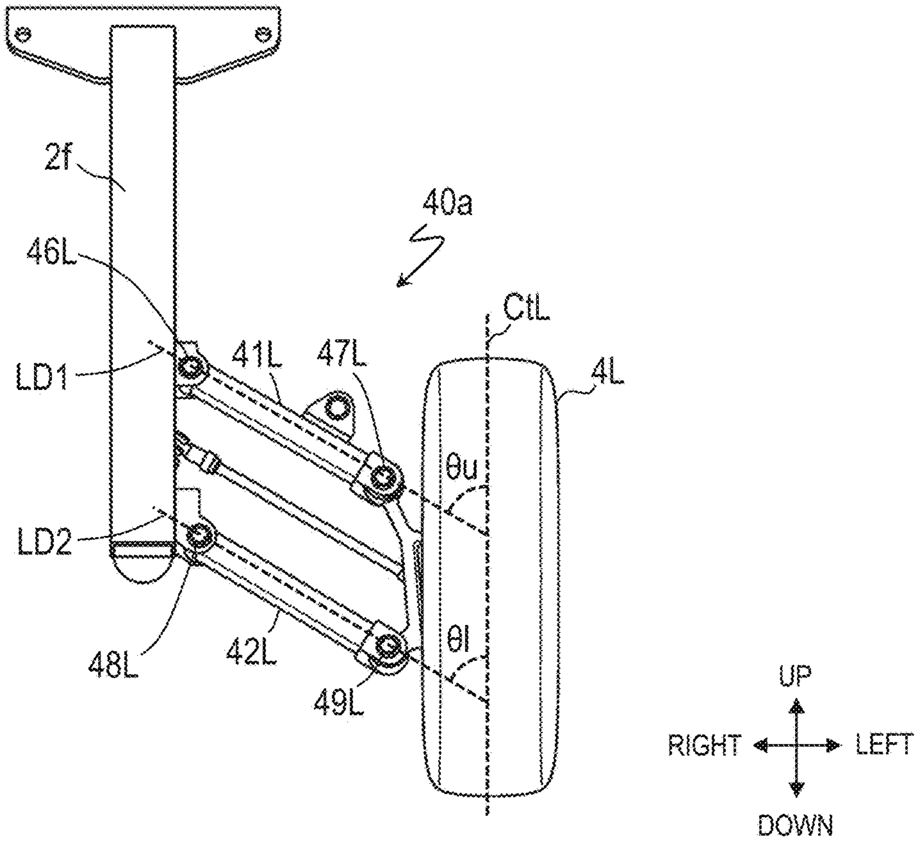
FIG. 10 is a front view showing the front suspension 40*a* according to the comparative example.

FIG. 9 and FIG. 10 are front views showing, as a comparative example, a front suspension 40*a* where the anhedral angle $\theta_{42L}$ of the lower arm 42L (FIG. 3) and the anhedral angle $\theta_{41L}$ of the upper arm 41L are equal to each other. In the front suspension 40*a*, the longitudinal direction LD1 of the upper arm 41L is parallel to the longitudinal direction LD2 of the lower arm 42L. FIG. 9 shows the front suspension 40*a* when the steered wheel 4L moves in the upward direction. FIG. 10 shows the front suspension 40*a* when the steered wheel 4L moves in the downward direction.

When the front suspension 40*a* moves in a stroke, the camber angle does not substantially change. Therefore, the amount of change in the angle θu between the longitudinal direction LD1 of the upper arm 41L and the tire center line CtL when moving in a stroke is large. Similarly, the amount of change in the angle θ1 between the longitudinal direction LD2 of the lower arm 42L and the tire center line CtL when moving in a stroke is large.

The amount of change in the angle between the longitudinal direction of the arm and the tire center line being large means that the change in the positional relationship between the arm and the steered wheel is large. As the positional relationship between the arm and the steered wheel changes significantly, it is difficult to provide clearance.

On the other hand, as described above, with the front suspension 40 of the present preferred embodiment, the change in the positional relationship between the arm and the steered wheel is small. Thus, it is possible to increase the clearance between the front suspension 40 and the steered wheel 4L, and it is possible to increase the steering angle of the steered wheel 4L and to increase the wheel stroke.

In the present preferred embodiment, when the front suspension 40 makes a bound stroke, the camber angle θc of the steered wheel 4L can have a negative camber. When the front suspension 40 makes a rebound stroke, the camber angle θc of the steered wheel 4L can have a positive camber. By varying the camber angle θc between the negative camber and the positive camber in response to the stroke of the front suspension 40, it is possible to reduce the amount of change in the angle between the longitudinal direction of the arm and the tire center line.

Note that the upper limit of the amount of change in the camber angle θc with respect to wheel stroke is, for example, but not limited to, 10 degrees.

Figure 11:
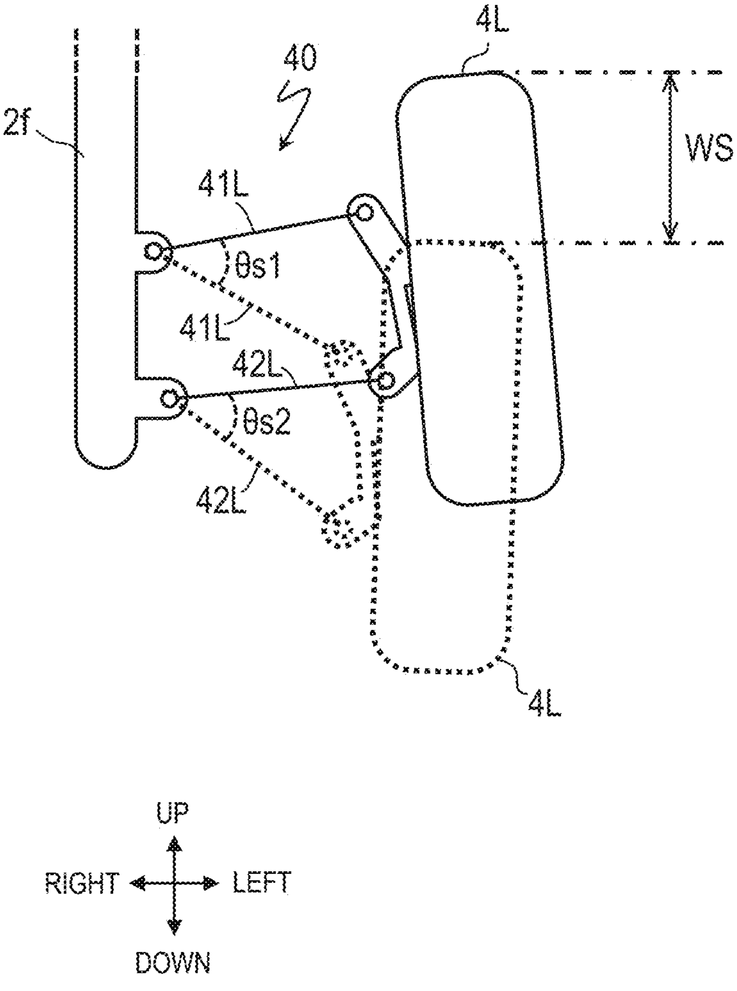
FIG. 11 is a front view showing the front suspension 40 according to a preferred embodiment of the present invention.

FIG. 11 is a front view showing the front suspension 40 of the present preferred embodiment. FIG. 11 shows the front suspension 40 in the bound stroke state is indicated by a solid line, and the front suspension 40 in the rebound stroke state is indicated by a dotted line.

In the present preferred embodiment, since it is possible to increase the clearance between the front suspension 40 and the steered wheel 4L, it is possible to increase the arm swing angle and the wheel stroke.

The swing angle θs1 of the upper arm 41L and the swing angle θs2 of the lower arm 42L are each 30 degrees or more, for example. With the large swing angle of 30 degrees or more, it is possible to improve the driving performance on unpaved roads and bumps. The wheel stroke WS is, for example, 60 mm or more. With the large wheel stroke WS of 60 mm or more, it is possible to improve the driving performance on unpaved roads and bumps.

The wheel stroke WS is 0.5 times or more of the length $D_{41}$ (FIG. 7) in the longitudinal direction of the upper arm 41L and 0.5 times or more of the length $D_{42}$ in the longitudinal direction of the lower arm 42L. The length in the longitudinal direction of the arm is, for example, the length between the center of the pivot on the front frame 2F side and the center of the pivot on the knuckle arm side. As the wheel stroke WS is large relative to the length of the arm, it is possible to improve the driving performance on unpaved roads and bumps.

The upper limit of the swing angles θs1 and θs2 is, for example, but not limited to, 60 degrees. The upper limit of the wheel stroke WS is, for example, but not limited to, 150 mm. The wheel stroke WS is, for example, but not limited to, at maximum 0.80 times the length in the longitudinal direction of the arm.

Figure 12:
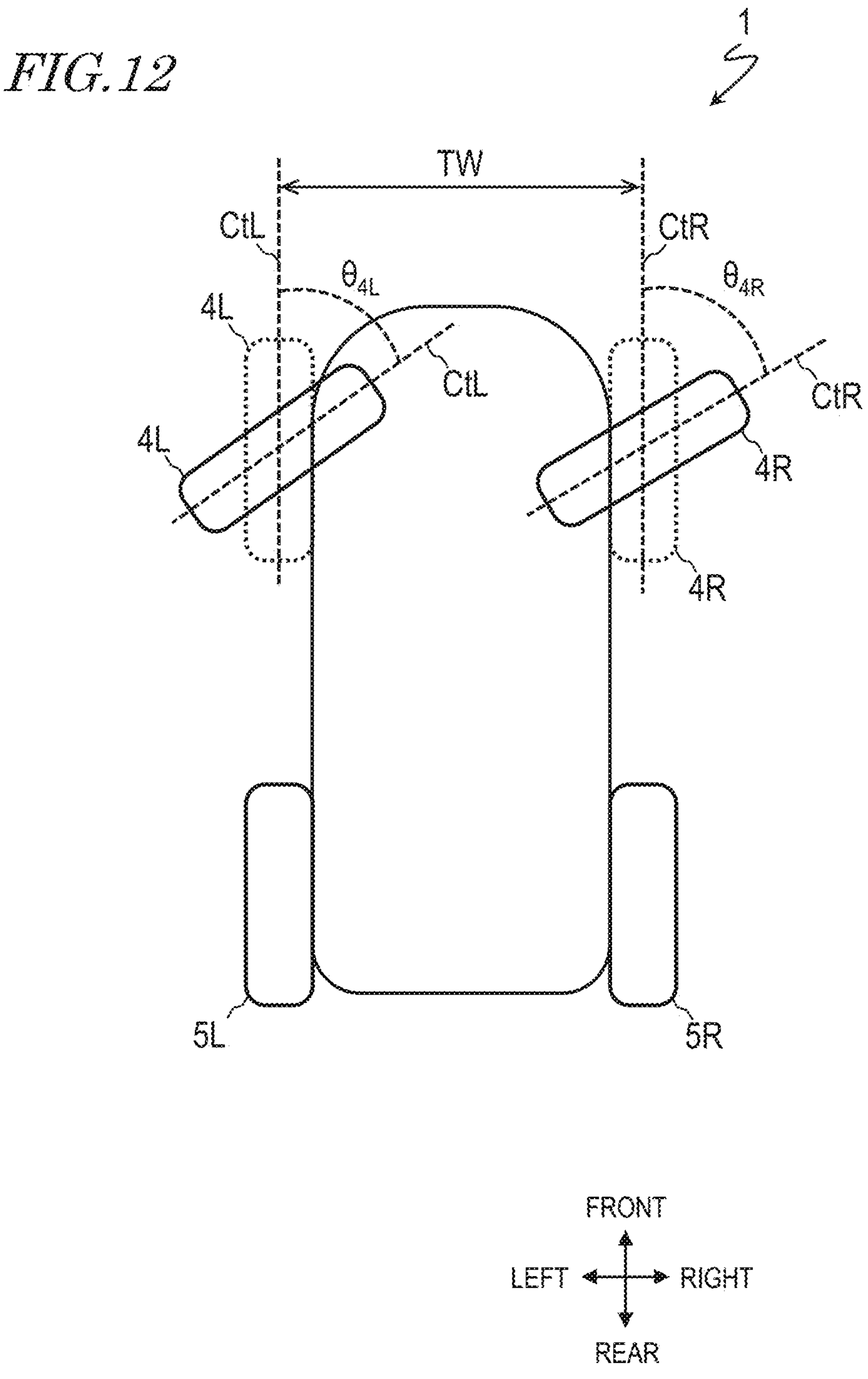
FIG. 12 is a diagram showing the steering angles of steered wheels 4L and 4R according to a preferred embodiment of the present invention.

Next, the steering angle of the steered wheels 4L and 4R will be described. FIG. 12 are views showing the steering angle of the steered wheels 4L and 4R. The reference signs CtL and CtR in FIG. 12 represent the tire center lines of the steered wheels 4L and 4R. FIG. 12 shows the steering angle when the vehicle 1 is turning right. In the present preferred embodiment, since it is possible to increase the clearance between the front suspension 40 and the steered wheel 4L, it is possible to increase the steering angle of the steered wheels 4L and 4R.

When the vehicle 1 turns right, the steered wheel 4R is the inner wheel and the steered wheel 4L is the outer wheel. In the present preferred embodiment, the maximum value of the steering angle of the inner wheel is, for example, 50 degrees or more, and the maximum value of the steering angle of the outer wheel is, for example, 35 degrees or more.

In this example, the steering angle of the inner wheel is larger than the steering angle of the outer wheel. Such a relationship in the steering angle between the inner wheel and the outer wheel can be achieved, for example, by employing Ackermann-type steering. It may also be realized, for example, by a steering system in which the steering angle of the inner wheel and the steering angle of the outer wheel are controlled independently of each other.

As described above, with the steering angles of the steered wheels 4L and 4R are large, it is possible to reduce the minimum turning radius of the vehicle 1, and it is possible to turn in a small radius. The maximum value of the steering angle of the inner wheel is, for example, but not limited to, 80 degrees or less. The maximum value of the steering angle of the outer wheel is, for example, but not limited to, 80 degrees or less.

As described above, in the present preferred embodiment, it is possible to reduce the minimum turning radius of the vehicle 1. For example, the minimum turning radius of the vehicle 1 can be as small as 2.5 times or less of the tread width TW of the steered wheels 4L and 4R. The minimum turning radius of the vehicle 1 is, for example, 1400 mm or less. As the minimum turning radius of the vehicle 1 is small, it is possible to turn in a small radius.

While the vehicle 1 is a four-wheeled handle-type electric wheelchair in the description of a preferred embodiment above, the vehicle 1 is not limited thereto. The vehicle 1 may be a joystick-type electric wheelchair. The vehicle 1 is not limited to a wheelchair, but may be another vehicle.

The number of wheels of the vehicle 1 is not limited to four wheels. The number of wheels may be three or more. The drive source to drive the wheels is not limited to an electric motor, but may be an internal combustion engine. The driving force may be transmitted from one drive source to multiple wheels.

Illustrative preferred embodiments of the present invention have been described above.

The vehicle 1 according to a preferred embodiment of the present invention includes at least three wheels including a steered wheel 4L, 4R; at least one drive source 60L, 60R to drive at least two of the wheels; and a front suspension 40 having an upper arm 41L, 41R and a lower arm 42L, 42R supporting the steered wheel 4L, 4R, wherein, in a state where the vehicle 1 is stationary on a level road surface 15, an anhedral angle of the lower arm 42L, 42R is larger than an anhedral angle of the upper arm 41L, 41R; and a difference between the anhedral angle of the lower arm 42L, 42R and the anhedral angle of the upper arm 41L, 41R is 5 degrees or more.

As the anhedral angle of the lower arm 42L, 42R is larger than the anhedral angle of the upper arm 41L, 41R, with the anhedral angle difference being 5 degrees or more, it is possible to reduce the amount of change in the angle between the longitudinal direction of each of the upper arm 41L, 41R and the lower arm 42L, 42R and the tire center line when the front suspension 40 moves in a stroke. This increases the clearance between the front suspension 40 and the steered wheel 4L, 4R, and it is possible to both increase the wheel stroke WS and increase the steering angle of the steered wheel 4L, 4R.

In a preferred embodiment, the difference between the anhedral angle of the lower arm 42L, 42R and the anhedral angle of the upper arm 41L, 41R may be 5 degrees or more and 9 degrees or less.

As the difference between the anhedral angle of the lower arm 42L, 42R and the anhedral angle of the upper arm 41L, 41R is large, it is possible to reduce the amount of change in the angle between the longitudinal direction of each of the upper arm 41L, 41R and the lower arm 42L, 42R and the tire center line when the suspension 40 moves in a stroke.

In a preferred embodiment, the amount of change in a camber angle of the steered wheel 4L, 4R relative to the wheel stroke WS of the front suspension 40 may be 5 degrees or more.

As the camber angle of the steered wheel 4L, 4R significantly changes in response to the stroke of the front suspension 40, it is possible to reduce the amount of change in the angle between the longitudinal direction of each of the upper arm 41L, 41R and the lower arm 42L, 42R and the tire center line.

In a preferred embodiment, the amount of change in the camber angle of the steered wheel 4L, 4R relative to the wheel stroke WS of the front suspension 40 may be 5 degrees or more and 10 degrees or less.

As the camber angle of the steered wheel 4L, 4R significantly changes in response to the stroke of the front suspension 40, it is possible to reduce the amount of change in the angle between the longitudinal direction of each of the upper arm 41L, 41R and the lower arm 42L, 42R and the tire center line.

In a preferred embodiment, when the front suspension 40 moves in a bound stroke, the camber angle of the steered wheel 4L, 4R may have a negative camber; and when the front suspension 40 moves in a rebound stroke, the camber angle of the steered wheel 4L, 4R may have a positive camber.

As the camber angle changes between a negative camber and a positive camber in response to the stroke of the front suspension 40, it is possible to reduce the amount of change in the angle between the longitudinal direction of each of the upper arm 41L, 41R and the lower arm 42L, 42R and the tire center line.

In a preferred embodiment, in a state where the vehicle 1 is stationary on the level road surface 15, the anhedral angle of the upper arm 41L, 41R may be 15 degrees or more, and the anhedral angle of the lower arm 42L, 42R may be 20 degrees or more.

As the anhedral angle of the upper arm 41L, 41R and the anhedral angle of the lower arm 42L, 42R are as large as 15 degrees or more and 20 degrees or more, respectively, it is possible to increase the roll rigidity.

In a preferred embodiment, in a state where the vehicle 1 is stationary on the level road surface 15, the anhedral angle of the upper arm 41L, 41R may be 15 degrees or more and 20 degrees or less, and the anhedral angle of the lower arm 42L, 42R may be 20 degrees or more and 25 degrees or less.

As the anhedral angle of the upper arm 41L, 41R and the anhedral angle of the lower arm 42L, 42R are large, it is possible to increase the roll rigidity.

In a preferred embodiment, a swing angle of each of the upper arm 41L, 41R and the lower arm 42L, 42R may be 30 degrees or more.

As the swing angle of the upper arm 41L, 41R and the swing angle of the lower arm 42L, 42R are as large as 30 degrees or more, it is possible to improve the driving performance on unpaved roads and bumps.

In a preferred embodiment, the swing angle of each of the upper arm 41L, 41R and the lower arm 42L, 42R may be 30 degrees or more and 60 degrees or less.

As the swing angle of the upper arm 41L, 41R and the swing angle of the lower arm 42L, 42R are large, it is possible to improve the driving performance on unpaved roads and bumps.

In a preferred embodiment, the wheel stroke WS of the front suspension 40 may be 60 mm or more.

As the wheel stroke WS is as large as 60 mm or more, it is possible to improve the driving performance on unpaved roads and bumps.

In a preferred embodiment, the wheel stroke WS of the front suspension 40 may be 60 mm or more and 150 mm or less.

As the wheel stroke WS is large, it is possible to improve the driving performance on unpaved roads and bumps.

In a preferred embodiment, the wheel stroke WS of the front suspension 40 may be 0.5 times or more of the length in the longitudinal direction of each of the upper arm 41L, 41R and the lower arm 42L, 42R.

As the wheel stroke WS is as large as 0.5 times or more of the length in the longitudinal direction of each of the upper arm 41L, 41R and the lower arm 42L, 42R, it is possible to improve the driving performance on unpaved roads and bumps.

In a preferred embodiment, the wheel stroke WS of the front suspension 40 may be 0.5 times or more and 0.80 times or less of the length in the longitudinal direction of each of the upper arm 41L, 41R and the lower arm 42L, 42R.

As the wheel stroke WS is large, it is possible to improve the driving performance on unpaved roads and bumps.

In a preferred embodiment, the steered wheel 4L, 4R may include an inner wheel and an outer wheel, a maximum value of a steering angle of the inner wheel may be 50 degrees or more, and a maximum value of a steering angle of the outer wheel may be 35 degrees or more.

As the steering angle of the steered wheel 4L, 4R is large, it is possible to reduce the minimum turning radius of the vehicle 1, and it is possible to turn in a small radius.

In a preferred embodiment, the maximum value of the steering angle of the inner wheel may be 50 degrees or more and 80 degrees or less, and the maximum value of the steering angle of the outer wheel may be 35 degrees or more and 80 degrees or less.

As the steering angle of the steered wheel 4L, 4R is large, it is possible to reduce the minimum turning radius of the vehicle 1, and it is possible to turn in a small radius.

In a preferred embodiment, the minimum turning radius of the vehicle 1 may be 2.5 times or less of the tread width of the steered wheels 4L, 4R.

As the minimum turning radius for the tread width is small, it is possible to turn in a small radius.

In a preferred embodiment, the minimum turning radius of the vehicle 1 may be 1400 mm or less.

As the minimum turning radius of the vehicle 1 is small, it is possible to turn in a small radius.

In a preferred embodiment, an outer diameter Dw of the steered wheel 4L, 4R may be 0.26 times or more of an overall length Lo of the vehicle 1.

As the outer diameter Dw of the steered wheel 4L, 4R is as large as 0.26 times or more of the overall length Lo of the vehicle 1, it is possible to improve the driving performance on unpaved roads and bumps and to improve the ride comfort.

In a preferred embodiment, the outer diameter Dw of the steered wheel 4L, 4R may be 0.26 times or more and 0.4 times or less of the overall length Lo of the vehicle 1.

As the outer diameter Dw of the steered wheel 4L, 4R is large relative to the overall length Lo of the vehicle 1, it is possible to improve the driving performance on unpaved roads and bumps and to improve the ride comfort.

In a preferred embodiment, the outer diameter Dw of the steered wheel 4L, 4R may be 0.43 times or more of a wheelbase of the vehicle 1.

As the outer diameter Dw of the steered wheel 4L, 4R is as large as 0.43 times or more of the wheelbase of the vehicle 1, it is possible to improve the driving performance on unpaved roads and bumps and to improve the ride comfort.

In a preferred embodiment, the outer diameter Dw of the steered wheel 4L, 4R may be 0.43 times or more and 0.67 times or less of a wheelbase of the vehicle 1.

As the outer diameter Dw of the steered wheel 4L, 4R is large relative to the wheelbase of the vehicle 1, it is possible to improve the driving performance on unpaved roads and bumps and to improve the ride comfort.

In a preferred embodiment, the vehicle 1 may be a handle-type electric wheelchair, and may further include a handle 6 that is steered by a passenger, and a seat 3 on which the passenger is seated.

It is possible to realize a handle-type electric wheelchair, wherein the wheel stroke WS is large and the steering angle of the steered wheel 4L, 4R is large.

Preferred embodiments of the present invention are particularly useful in the field of vehicles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:

at least three wheels including a steered wheel;

at least one drive source to drive at least two of the wheels; and a suspension including an upper arm and a lower arm supporting the steered wheel; wherein in a state where the vehicle is stationary on a level road surface, an anhedral angle of the lower arm is larger than an anhedral angle of the upper arm, and a difference between the anhedral angle of the lower arm and the anhedral angle of the upper arm is 5 degrees or more.

2. The vehicle according to claim 1, wherein the difference between the anhedral angle of the lower arm and the anhedral angle of the upper arm is 5 degrees or more and 9 degrees or less.

3. The vehicle according to claim 1, wherein an amount of change in a camber angle of the steered wheel relative to a wheel stroke of the suspension is 5 degrees or more.

4. The vehicle according to claim 3, wherein the amount of change in the camber angle of the steered wheel relative to the wheel stroke of the suspension is 5 degrees or more and 10 degrees or less.

5. The vehicle according to claim 1, wherein when the suspension moves in a bound stroke, the camber angle of the steered wheel has a negative camber; and when the suspension moves in a rebound stroke, the camber angle of the steered wheel has a positive camber.

6. The vehicle according to claim 1, wherein, in a state where the vehicle is stationary on a level road surface, the anhedral angle of the upper arm is 15 degrees or more, and the anhedral angle of the lower arm is 20 degrees or more.

7. The vehicle according to claim 6, wherein, in a state where the vehicle is stationary on a level road surface, the anhedral angle of the upper arm is 15 degrees or more and 20 degrees or less, and the anhedral angle of the lower arm is 20 degrees or more and 25 degrees or less.

8. The vehicle according to claim 1, wherein a swing angle of the upper arm and a swing angle of the lower arm are each 30 degrees or more.

9. The vehicle according to claim 8, wherein the swing angle of the upper arm and the swing angle of the lower arm are each 30 degrees or more and 60 degrees or less.

10. The vehicle according to claim 1, wherein a wheel stroke of the suspension is 60 mm or more.

11. The vehicle according to claim 10, wherein the wheel stroke of the suspension is 60 mm or more and 150 mm or less.

12. The vehicle according to claim 1, wherein a wheel stroke of the suspension is 0.5 times or more of a length in a longitudinal direction of each of the upper arm and the lower arm.

13. The vehicle according to claim 12, wherein the wheel stroke of the suspension is 0.5 times or more and 0.8 times or less of a length in the longitudinal direction of each of the upper arm and the lower arm.

14. The vehicle according to claim 1, wherein the steered wheel includes an inner wheel and an outer wheel;

a maximum value of a steering angle of the inner wheel is 50 degrees or more; and a maximum value of a steering angle of the outer wheel is 35 degrees or more.

15. The vehicle according to claim 14, wherein the maximum value of the steering angle of the inner wheel is 50 degrees or more and 80 degrees or less; and the maximum value of the steering angle of the outer wheel is 35 degrees or more and 80 degrees or less.

16. The vehicle according to claim 1, wherein a minimum turning radius of the vehicle is 2.5 times or less of a tread width of the steered wheel.

17. The vehicle according to claim 1, wherein a minimum turning radius of the vehicle is 1400 mm or less.

18. The vehicle according to claim 1, wherein an outer diameter of the steered wheel is 0.26 times or more of a total length of the vehicle.

19. The vehicle according to claim 18, wherein an outer diameter of the steered wheel is 0.26 times or more and 0.4 times or less of an overall length of the vehicle.

20. The vehicle according to claim 1, wherein an outer diameter of the steered wheel is 0.43 times or more of a wheelbase of the vehicle.

21. The vehicle according to claim 1, wherein an outer diameter of the steered wheel is 0.43 times or more and 0.67 times or less of a wheelbase of the vehicle.

22. The vehicle according to claim 1, wherein the vehicle is an electric wheelchair including a handle to be steered by a passenger; and the vehicle further includes a seat on which the passenger is to be seated.

* * * * *